United States Patent
Cavalli et al.

(10) Patent No.: US 7,308,281 B2
(45) Date of Patent: Dec. 11, 2007

(54) OPTIMAL TWO-LEG HISTERESYS FOR POWER CONTROL AND PHY MODE SWITCHING CONTROL IN ADAPTIVE PHY MODE SYSTEMS

(75) Inventors: Giulio Cavalli, Milan (IT); Gaspare Licitra, Gorgonzola (IT); Claudio Santacesaria, Milan (IT)

(73) Assignee: Siemens Mobile Communications S.p.A., Milan (IT)

( * ) Notice: Subject to any disclaimer, the term of this patent is extended or adjusted under 35 U.S.C. 154(b) by 542 days.

(21) Appl. No.: 10/287,393

(22) Filed: Nov. 5, 2002

(65) Prior Publication Data

US 2003/0109278 A1 Jun. 12, 2003

(30) Foreign Application Priority Data

Dec. 5, 2001 (EP) .................................. 01830745

(51) Int. Cl.
*H04B 7/00* (2006.01)
*H04Q 7/20* (2006.01)
*H04Q 11/12* (2006.01)

(52) U.S. Cl. ................. 455/522; 455/127.1; 455/127.4; 455/127.5

(58) Field of Classification Search ................. 455/522, 455/524, 63.1, 69, 115.3, 127.5, 226.1, 127.1, 455/226.2, 160.1
See application file for complete search history.

(56) References Cited

U.S. PATENT DOCUMENTS

| | | | |
|---|---|---|---|
| 5,392,459 A | 2/1995 | Baba et al. | |
| 5,991,618 A | 11/1999 | Hall | |
| 6,134,230 A | 10/2000 | Olofsson et al. | |
| 6,879,840 B2 * | 4/2005 | Razavilar et al. | ........... 455/522 |

FOREIGN PATENT DOCUMENTS

| | | |
|---|---|---|
| WO | WO 99/20016 A1 | 4/1999 |
| WO | WO 99/21287 A1 | 4/1999 |
| WO | WO 00/41318 A1 | 7/2000 |
| WO | WO 01/10048 A1 | 2/2001 |

* cited by examiner

*Primary Examiner*—Matthew D. Anderson
*Assistant Examiner*—Eugene Yun
(74) *Attorney, Agent, or Firm*—Birch, Stewart, Kolasch & Birch, LLP

(57) ABSTRACT

In radio transmission systems with point-to-point and point-to-multipoint topology a master station and one or several terminal stations are defined as well as a downstream channel from the master station to the terminal stations and an upstream channel from the terminal stations to the master station. In such systems, in order to send traffic to several terminal stations, the downstream channel is used by the master station in time division multiplexing.

In some cases, the modulation type and the forward error correction, jointly called phy mode, depend on the addressed terminal. These systems are called adaptive phy mode systems.

The present invention relates to adaptive phy mode systems, and it defines a power control technique for the terminal stations that also commands the phy mode switching and optimizes the system in terms of coverage, capacity and interference. In particular the terminal stations transmit with the several phy modes so that the signals are received at the master station making a performance related parameter equal. Then a hysteresis based on two different parameters (received power and available unused transmit power) is defined which regulates the phy mode switching.

32 Claims, 2 Drawing Sheets

OPTIMAL TWO-LEG HISTERESYS FOR POWER CONTROL AND PHY MODE SWITCHING CONTROL IN ADAPTIVE PHY MODE SYSTEMS

FIELD OF THE INVENTION

The present invention relates particularly to point-to-point and point-to-multipoint radio network systems, as well as to other transmission systems working on different physical media. In particular this invention applies to adaptive phy mode systems.

BACKGROUND ART

In point-to-multipoint systems, whatever physical medium is used, a master station and one or several terminal stations, also called terminals, are defined. While a particular embodiment of the present invention, applied to point-to-multipoint radio system, will be shown and described, it should be understood that the present invention is not limited thereto since other embodiments may be made by those skilled in the art without departing from the ambit of the invention.

The transmissions from the master station to one or more terminal stations are made on one logical channel, also called "downstream channel", typically with time division multiplexing approach.

The transmissions from the terminal stations to the master are made on another logical channel, also called "upstream channel". The upstream is divided from the downstream channel by time division duplexing or by frequency division duplexing, that is the transmissions in upstream direction could be made either in different frequency channels, or in the same frequency channel but in different time-intervals.

In other physical media alternative duplexing mechanisms could be used.

With the term "phy mode" we mean the combination of modulation and FEC (Forwarding Error Check). Each phy mode is characterized by a different throughput and a different robustness.

Different systems are known and in particular:
1. traditional systems, in which the master and the terminal stations could transmit using only one phy mode, even if the master may not use the same as the terminal stations, and
2. new system generations which can support adaptive phy modes.

With the term "adaptive phy modes" we mean that the transmission stations, master or terminals, can use, in the reception or in the transmission of data, a certain number of phy modes, in different time intervals and in the same frequency channel.

The transmitted power level cannot be the same for all the terminal stations, but it is function of the distance from the master station, of climate conditions, and of phy modes. In traditional systems, which do not support adaptive phy modes, an automatic power level control, also called "ATPC", regulates the transmission level of the terminal stations. In the known art, with the ATPC techniques in traditional systems, the master station passes, in the downstream channel, the information in order to regulate the transmitted power level of each terminal station. In this way the mean power level of the signals transmitted by the terminal stations and received by the above-mentioned master station is kept near a predefined level.

A minimum received level, also called "threshold level", and a typical received level, near which the master receives the signals, somewhat higher than the threshold level, also called "working point", are defined.

Once the working level is set, taking implementation issues into account, the master station automatically instructs the terminal stations, by means of signaling messages, so that the terminal stations transmit the correct power level in order to be received by the master near the working point.

The above-mentioned working points and threshold levels are reference points, computed from implementation issues and from system dimensioning.

Air fading is time variable. In traditional systems the received power level is kept near the working point. When the terminal station has not the sufficient power to counteract for example rain fading, the received power level at the master decreases.

In non adaptive phy modes systems the master station and the terminal stations transmit and receive using a phy mode, defined in advance at the implementation of the system. Accordingly the setting of the transmission power level of the terminal stations regards only the phy mode used for the transmission by the transmitting station. For example consider a terminal station transmitting a phy mode 16QAM without FEC. Typically, in normal working condition, the signal transmitted by this terminal station is received by the master station near the working point. In this condition the master station tells to the terminal station that the transmitted power level is correct. Let's presume now that the fading increases, for example due to rain. The signal is received by the master station with a power level lower and lower as the rain fading increases. In this transition period, the terminal station transmits always at the same power level. When the signal received at the master station reaches a threshold, lower than the working point, the master station tells the terminal station to increase the transmitted power level in order to counteract the fading. With this procedure the received power level remains close to working point. In the same way the decreased attenuation is counteracted. If the received signal passes a threshold above the working point, the master station tells the terminal station to reduce the transmitted power level. When the received power level is back to the working point, with proper signaling messages, the master station tells the terminal station to keep the transmitted power level constant.

The ATPC techniques for traditional systems are well known for reducing power consumption and improving the reliability of wireless transmission devices (for example see JP 9214269 and JP 2000101456 in the name of Fujitsu LTD). The constraints to be defined in the project stage are, beside the working point, the maximum and minimum levels that regulate the messaging signals in order to increase or decrease the transmitted power level of the terminal stations. The above-mentioned maximum and minimum thresholds have to be chosen in the proper way; not too far from the working point, in order to quickly counteract the signal fading; not too close to the working point, in order to avoid uncontrollable cycles due to message propagation and response time.

In some systems the thresholds are not defined, and the control is made by periodical messages, always present even with small fading. In all cases, ideally, the algorithm controls the transmitted power level in order to keep the average received signal constant and close to the working point of the used phy mode. Even if we make explicit reference to the average received power, the peak received power, the signal to noise ratio or the signal to noise plus interference ratio are equivalent here and in the following and might be used together with or instead of the mentioned average received power in any of the following instances. For the sake of simplicity this remark will not be repeated each time but the invention intends to cover implementations with any of those parameters monitored or also with any combination of those parameters.

In adaptive phy mode systems, the phy mode is not defined by default, but the master station and the terminal stations can switch from one phy mode to another while the system is working. The management and control messages between the master station and the terminal stations are transmitted using the pre-defined most robust phy mode. The data are transmitted using one of the phy modes, decided time by time by the master station. Depending on some parameters, such as distance, climate condition and interference, the master station can tell the terminal station to switch from a phy mode to another one supported by both the master and the terminal station.

In the European patent application No. 1830201.8 in the name of Siemens Information and Communication Networks S.p.A., a technique is disclosed for applying power control to adaptive phy mode systems. The patent describes an algorithm, which jointly controls the power and the phy mode: the algorithm works on received power for controlling both the transmitted power and the phy mode changes; this control is implemented via messages sent from the master station to the terminal station. The algorithm can optionally take advantage if the master has the knowledge of unused available transmit power in the terminal. Said algorithm maximizes performance always allowing the use of the most efficient phy mode, which can be used given the channel conditions; it also keeps the received power within a limited range close to a predefined point called "working point". The transitions between phy modes define an hysteresis by setting different thresholds for transition from phy mode A to phy mode B and viceversa.

SCOPE AND SUMMARY OF THE INVENTION

The aim of the present invention is to add a further improvement to the algorithm disclosed in EP 1830201.8. In particular, as disclosed in claim 1, the present invention allows to also minimize the produced interference by avoiding a transmission at a power level corresponding to a received power higher than the working point.

The basic idea is to use two different criteria to decide the transition towards a more robust and less efficient phy mode and to decide the transition in the opposite direction. There is still an hysteresis but it is based on two different parameters.

The present invention requires that the master station knows the available power margin in the terminal, that is how much the terminal might increase its transmission power at a given time. This knowledge can be achieved through a specific message that the terminal sends periodically to the master station.

The transition from a more efficient to a more robust phy mode is, as disclosed in EP 1830201.8, based on the received power (or signal to noise or signal to noise plus interference) which drops below a certain threshold regardless the power control messages to increase the transmitting power (the terminal has reached its maximum transmission power and is not able to counteract fading any longer). This transition is decided in the master station based on a parameter, the received power, that can locally be measured and therefore it is readily available leading to a quick response. This quick response, also available in EP 1830201.8, is essential for this type of transition otherwise the system might reach the threshold during a fast fading.

The transition from a more robust to a more efficient phy mode is based instead on the available power margin. In EP 1830201.8 the received power level might increase above the working point before a transition to more efficient phy mode. With the present invention the power control will keep the power at the working point until a sufficient power margin is available to switch to the more efficient phy mode (increasing the power at the same time).

The hysteresis is defined on the two different parameters: received power for one direction of transition and available power margin in the opposite direction.

The transition to the more efficient phy mode might be slower but this is unessential since it will only introduce a slight delay in the availability of higher capacity. The advantage is instead that no terminal will ever transmit with higher power than the working point therefore minimizing the produced interference.

Another advantage of this algorithm is that it can work with measurements of the available power margin that are given with a gross precision and are sent from the terminal to the master relatively infrequently.

Moreover this algorithm easily applies to systems where the maximum transmission power is different at different phy modes, situation which is quite common since different modulations have different back-off values.

It is important to point out that the parameter locally monitored on the master station might be the signal to noise ratio (C/N) or the signal to noise plus interference ratio (C/N+I) instead of or in addition to the received power (Pr) and decisions to send commands to modify the transmitted power might be based on any of the three parameters C/N, C/N+I or Pr or on a combination of those; decisions to switch the phy mode might also be based on the same or a different choice among the three parameters C/N, C/N+I or Pr or on the same or a different combination of those. This last step is considered an obvious extension of what described before, since C/N, C/N+I and Pr are linked together.

BRIEF DESCRIPTION OF THE DRAWINGS

The invention, together with further objects and advantages thereof, may be understood with reference to the following description, taken in conjunction with the accompanying drawings and in which.

DETAILED DESCRIPTION OF THE PREFERRED EMBODIMENTS

All the description is based on a specific example where all the threshold values and phy modes might be different in different systems. We assume 3 phy modes with 4 dB gap between each other and a quality threshold at a bit error rate of $10^{-11}$. The choice of these values has the only purpose to simplify the description but shall not be seen as a restriction of the ambit of the invention. The number of phy modes and the gaps are either predefined or dependent on the master station implementation; in the latter case the master station may send a table of phy modes and gaps or working points or threshold levels or any equivalent information. In a preferred embodiment the master station sends to the terminal a table of the power change to be applied contextually to each phy mode switch, being the power change in one direction (from the more robust to the more efficient phy mode) independent of the power change in the opposite direction (from the more efficient to the more robust phy mode). In the following example the power change associated to each transition from more robust to more efficient phy mode is 4 dB whereas the power change associated to each transition from more efficient to more robust is zero.

Figure 1:
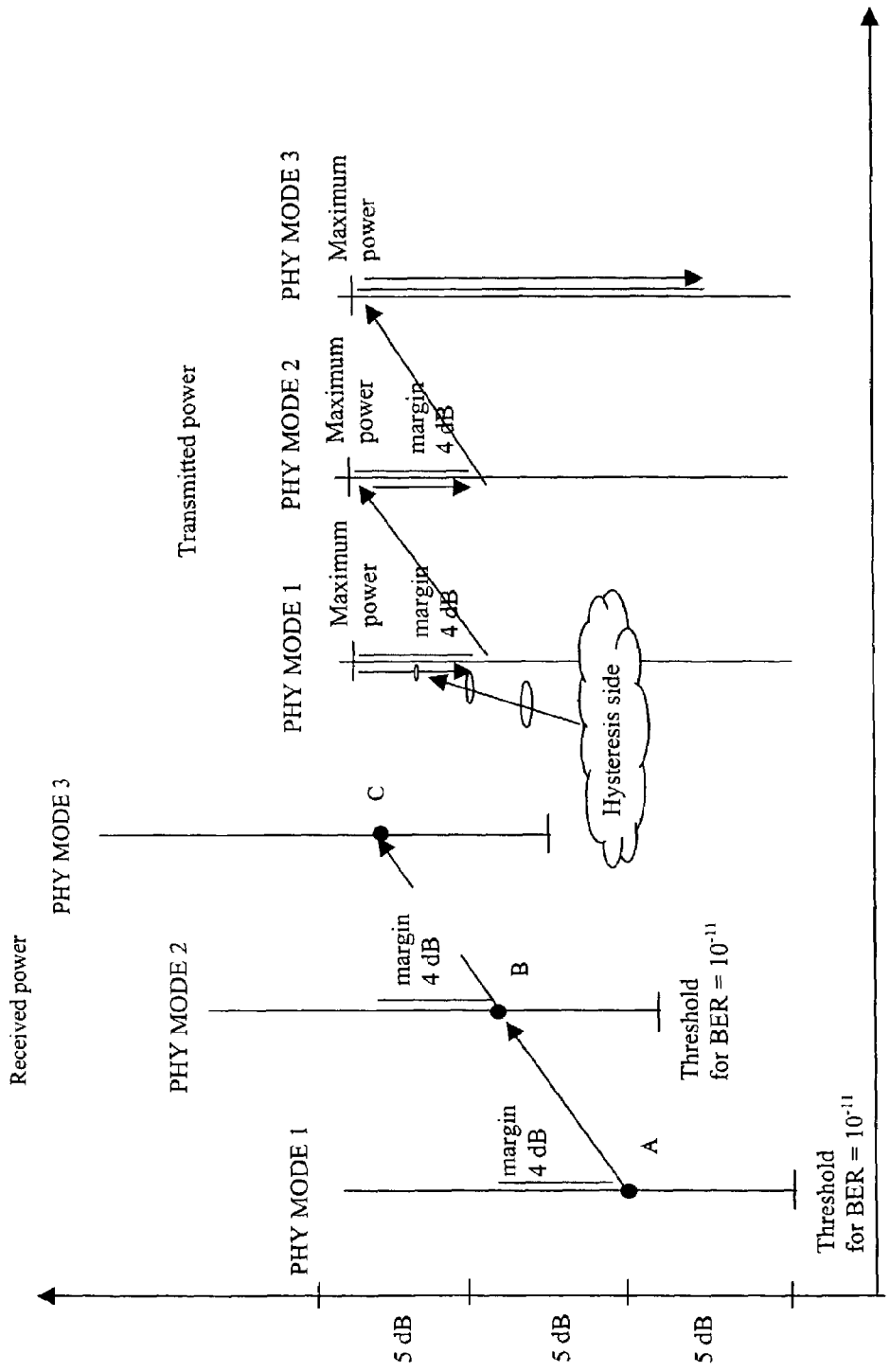
FIG. 1 shows transmitted and received power diagrams during decrease of fading (improvement of weather conditions)

With reference to FIG. 1, let us assume bad weather conditions; the terminal is transmitting at the maximum power with Phy mode 1 which is the most robust and the master is receiving at the nominal power in the working point A.

If the fading further increases, the received power will eventually drop below the nominal value and in some cases it might drop below the quality threshold that is the Bit error rate might be higher than the required $10^{-11}$.

If the fading decreases, the automatic power control will reduce the transmitted power of the terminal keeping the received power in the point A. As soon as the transmitted power is enough below the maximum, that is the available power margin is enough to guarantee the operation at the more efficient Phy mode 2, the master receives from the terminal the notification of the situation; in a preferred embodiment this notification is the available power margin itself which is periodically transmitted and compared in the master with a required value; in a different preffered embodiment the notification is the availability of the terminal to switch to Phy mode 2; the difference is only in where the comparison is made between the available power and required available power, whether in the terminal or in the master; in both cases, the next step is that the terminal is instructed to use PHY mode 2. The required available power is the theoretical threshold or signal to noise gap between PHY mode 1 and PHY mode 2 plus eventual additional implementation losses or corrections for PHY mode 2. The proper number shall be available in the entity (terminal or master), which makes the comparison. In this example we assume additional terms to be null.

In correctly defining the available power during transmission at PHY mode 1, the possibility that the maximum power at PHY mode 2 is different from the maximum power at PHY mode 1 due to different back-off shall be taken into account and the available power margin might be referred to PHY mode 1 or PHY mode 2 maximum power; the required available power margin shall be defined accordingly including or not this additional back-off in the implementation losses or corrections. In a preferred embodiment the required available power margin is equal to the power change that the terminal shall apply after the phy mode switching; therefore it will not include the backoff; coherently the available power at PHY mode 1 is defined as the power that the terminal might use after transition to PHY mode 2 and in general the available power is the power that the terminal would have available after switching to a more efficient PHY mode.

In this example for the sake of simplicity we assume that the maximum transmission power is the same for all PHY modes, being the extension to the general case quite obvious.

Following the example, the terminal will begin transmitting with PHY mode 2 applying the power correction of 4 dB thus transmitting at the maximum power; the master station will receive at the working point B, which is the nominal working point for PHY mode 2. If the weather continues improving, the transmitted power is reduced by ATPC commands until the available margin is 4 dB; at that point the PHY mode is switched to PHY mode 3 and the transmitted power will be set back to the maximum. Still improving weather conditions the transmitted power is reduced to keep the received power in the working point C of PHY mode 3.

Figure 2:
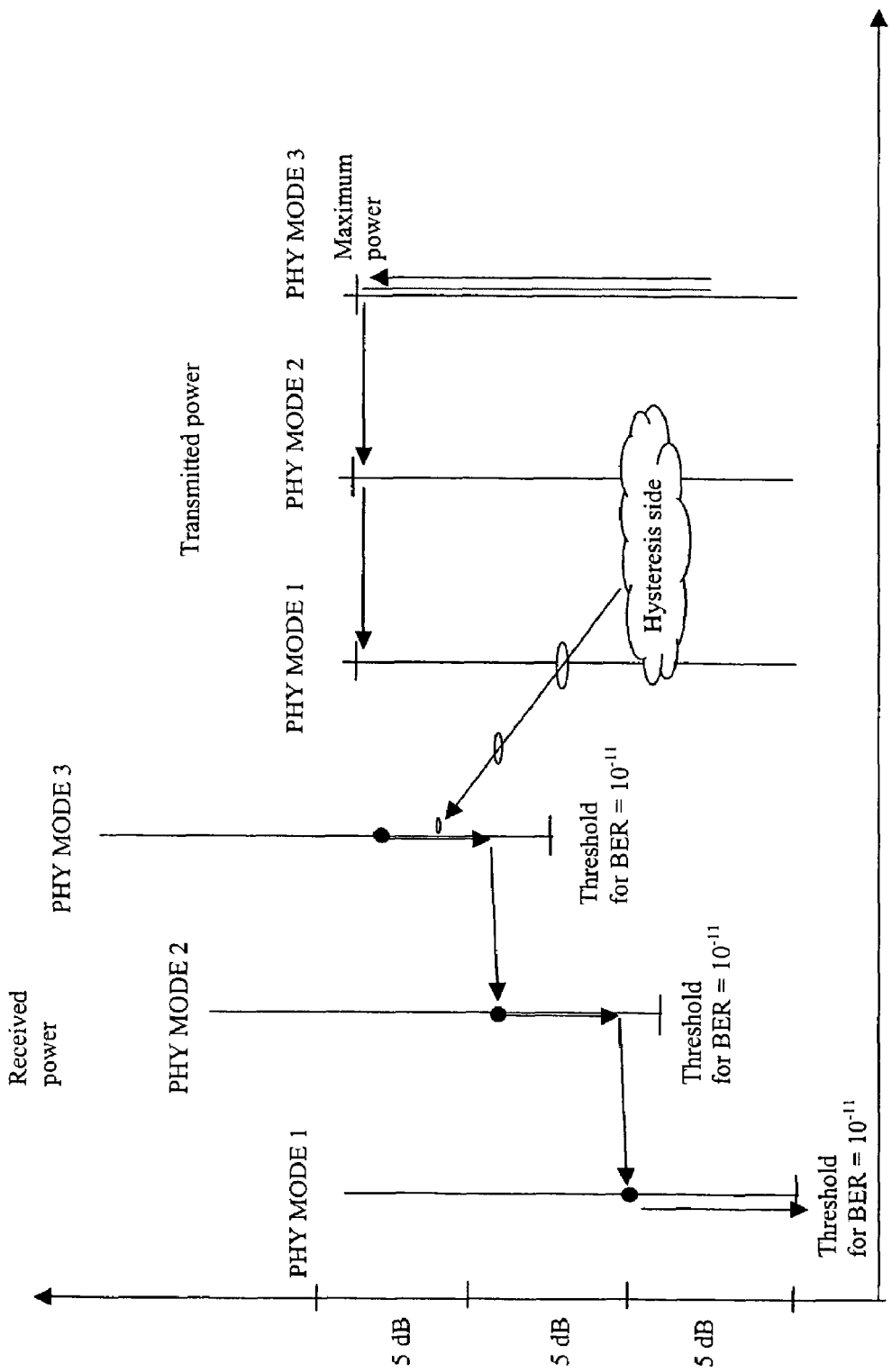
FIG. 2 shows transmitted and received power diagrams during increase of fading (worsening of weather conditions).

FIG. 2 shows the transition in the opposite direction. The fading is increasing and transmitted power is increased to keep the received power in C. When the maximum transmitted power is reached, the received power begins to decrease until a switching point when the master station commands to switch to a more robust phy mode. The switching point might be exactly 4 dB below the working point so that the terminal will switch modulation keeping the same transmitted power. It might also be higher (for example 3 dB below the working point) and the terminal should in that case reduce the transmitted power (by 1 dB in the example) during the switching. In the preferred embodiment the master sends to the terminal a table of power changes to be applied when switching phy mode and will take care to set the switching point at the appropriate level. In any case after switching the master shall receive Phy mode 2 in the working point B; the terminal will be instructed to increase the power if the fading continues to grow and when the terminal will not be able to increase the power further because it is already transmitting at the maximum power the received power drops below B until the switching to PHY mode 1, which happens according to the same rules of the switching from PHY mode 3 to PHY mode 2.

In PHY mode 1 a further worsening of weather will produce a reduction in received power and eventually an out of service condition if the received power drops too much below the acceptable working threshold.

From the comparison of FIG. 1 and FIG. 2 it is clear that there is an hysteresis which we might call "two leg" because the transition in one direction depends on the available unused transmit power measured at fixed received power (the one of the working point), while the transition in the opposite direction depends on the received power measured at fixed transmitted power (the maximum available in the terminal).

The algorithm requires that the master locally monitors the received power (average or peak) or equivalently a signal to noise or signal to noise plus interference value and the master has the knowledge of the available unused power margin in the terminal. This knowledge is guaranteed by messages from the terminals to the master or might be guaranteed by tracking in the master the ATPC messages sent to that terminal.

The algorithm is optimal in the sense that: it always guarantees the use of the most efficient PHY mode that can be used in given channel conditions if the measurements are precise and timely available, it always guarantees that the power does not exceed the required power to receive in the working point, it guarantees fast transitions to more robust phy modes during fading conditions because these transitions are based on a local measurement in the master station (received power or signal to noise or signal to noise plus interference), it allows to keep a small amount of signalling to inform the master station of the available unused power margin (even smaller or null if master station keeps track of sent ATPC commands), it works with minimal impact even if measurements of available unused power margin are not precise (for example if the terminal gives these measurements with 2 dB steps), it works fine if the maximum transmission power is different at different phy modes.

For all these reasons the algorithm of the present invention is better than any other known algorithm.

Different implementations are possible and suboptimal versions might be thought of by those skilled in the art without departing from the ambit of the following claims.

The invention claimed is:

1. An adaptive or variable phy mode transmission system with automatic power control comprising:
   at least one master station; and
   at least one terminal station, said terminal station adapted to regulate its transmit power when a signaling message is received from the master station on a communication channel,
   wherein said master station is adapted to:
   generate signaling messages to control a first quality parameter at a reference level predefined for each of a plurality of phy modes used by the terminal station for transmissions, the first quality parameter being determined from a transmission from the terminal station to the master station;
   store a parameter concerning an available unused power margin in the terminal station; and
   generate additional signaling messages that control transitions between the plurality of phy modes in each terminal station, taking into account at least for transitions to a more efficient phy mode at least said parameter concerning the available unused power margin,
   wherein each of the plurality of phy modes includes a particular combination of modulation and forward error check (FEC) schemes, and
   wherein the transitions between the plurality of phy modes in each terminal station are performed in such a manner that a transition from a first to second phy mode is initiated based on the available unused power margin, while a transition from the second to first phy mode is not dependent on the available unused power margin.

2. The system of claim 1 where said first quality parameter is the received power.

3. The system of claim 1 where said first quality parameter is signal to noise ratio.

4. The system of claim 1 where said first quality parameter is signal to noise plus interference ratio.

5. The system of claim 1, wherein said parameter concerning the available unused power margin is communicated by the terminal station to the master station through messages carrying the value of the margin itself with a predefined granularity.

6. The system of claim 5, wherein the master station controls the switching from a current phy mode to a more efficient and less robust phy mode when the available unused power margin is equal to or greater than a required available unused power margin.

7. The system of claim 6, wherein the terminal station under control reacts to the master station control by changing transmission phy mode and increasing the transmission power.

8. The system according to claim 7, in which a hysteresis is defined on the two following different parameters: said available unused power margin and said second quality parameter.

9. The system of claim 7, wherein the amount of increase in transmission power is predefined in the terminal station with same or different values for each switching between couples of phy modes.

10. The system of claim 7, wherein the amount of increase in transmission power is communicated by the master station with same or different values for each switching between couples of phy modes.

11. The system of claim 7 where said increase of transmission power is equal 10 said required available unused power margin.

12. The system of claim 6 in which said required available unused power margin depends on said more efficient phy mode and on said current phy mode.

13. The system of claim 6 in which said required available unused power margin is the theoretical threshold or signal to noise gap between said more efficient phy mode and said current phy mode plus eventual corrections dependent on the implementation.

14. The system of claim 6 in which said required available unused power margin is available in and used by the master in order to decide for a phy mode switching.

15. The system of claim 14 in which the available unused power margin is sent by the terminal to the master for the comparison and is expressed with an encoding of the number of dB by which the terminal might increase the transmission power from the current level after switching to a more efficient phy mode and taking into account the eventual additional backoff of said more efficient phy mode.

16. The system of claim 6 in which, for a couple of phy modes, said predefined switching level is below the working point of the more efficient of the two phy modes by an amount equal to said required available unused power margin for the switching from the more robust to the more efficient of the two phy modes.

17. The system of claim 1, wherein said parameter concerning the available unused power margin is tracked by the master station accounting for power control messages that the master station has sent to the terminal station.

18. The system claim 1, wherein said parameter concerning the available unused power margin is communicated by the terminal station to the master station through a message of availability of enough power to switch to a more efficient phy mode.

19. The system of claim 18 in which said required available unused power margin is available in and used by the terminal to generate said message of availability of enough power to switch to a more efficient phy mode.

20. The system of claim 1, wherein the master station controls the switching to a less efficient and more robust phy mode when a second quality parameter drops below a predefined switching level.

21. The system of claim 20 where said second quality parameter is the received power.

22. The system of claim 20 where said second quality parameter is signal to noise ratio.

23. The system of claim 20 where said second quality parameter is signal to noise plus interference ratio.

24. The system of claim 20, wherein the terminal reacts to the master station control by changing transmission phy mode and optionally modifying transmission power.

25. The system of claim 24 in which said optional modification of transmitted power is absent.

26. The system of claim 24 in which said optional modification of transmitted power is predefined with same or different values for each switching between couples of phy modes.

27. The system of claim 24 in which said optional modification of transmitted power is sent by the master station to the terminal station with same or different values for each switching between couples of phy modes.

28. The system of claim 1, further comprising:
at least one station adapted to play both the master role and the terminal role.

29. A terminal station for use in an adaptive or variable phy mode transmission system with automatic power control including at least one master station and one or several terminal stations said terminal station comprising:
- a power control unit that regulates transmit power and switching between a plurality of phy modes when signaling messages are received from the master station on a communication channel, the switching between phy modes being performed in such a manner that a switch from a first to second phy mode is initiated based on an available unused power margin, while a switch from the second to first phy mode is not dependent on the available unused power margin; and
- a communication unit that communicates to the master station a parameter concerning the available unused power margin,
- wherein each of the plurality of phy modes includes a particular combination of modulation and forward error check (FEC) schemes.

30. The terminal station as claimed in claim 29, wherein said parameter is communicated to the master station through messages carrying the value of the margin itself with a predefined granularity.

31. The terminal station as claimed in claim 29, wherein said parameter is communicated to the master station through a message of availability of enough power to switch to a more efficient phy mode.

32. The terminal station as claimed in claim 29, further comprising:
- a phy mode unit that changes a transmission phy mode and optionally modifies transmission power in response to control by the master station.

* * * * *